United States Patent
Tsukada et al.

(10) Patent No.: US 9,780,423 B2
(45) Date of Patent: Oct. 3, 2017

(54) AIR BATTERY

(71) Applicant: NISSAN MOTOR CO., LTD., Kanagawa (JP)

(72) Inventors: Yoshiko Tsukada, Yokohama (JP); Atsushi Miyazawa, Kamakura (JP); Mori Nagayama, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 171 days.

(21) Appl. No.: 14/383,840

(22) PCT Filed: Feb. 21, 2013

(86) PCT No.: PCT/JP2013/054282
§ 371 (c)(1),
(2) Date: Sep. 8, 2014

(87) PCT Pub. No.: WO2013/133029
PCT Pub. Date: Sep. 12, 2013

(65) Prior Publication Data
US 2015/0099198 A1    Apr. 9, 2015

(30) Foreign Application Priority Data

Mar. 9, 2012   (JP) .................................. 2012-052768
Mar. 9, 2012   (JP) .................................. 2012-052771

(51) Int. Cl.
*H01M 12/08* (2006.01)
*H01M 8/04* (2016.01)
*H01M 8/04082* (2016.01)

(52) U.S. Cl.
CPC ....... *H01M 12/08* (2013.01); *H01M 8/04201* (2013.01); *H01M 2220/20* (2013.01); *Y02E 60/128* (2013.01)

(58) Field of Classification Search
CPC ...... H01M 12/08; H01M 4/382; H01M 4/405; H01M 4/74; H01M 4/64; H01M 8/04201
See application file for complete search history.

(56) References Cited

U.S. PATENT DOCUMENTS 3,462,307 A * 8/1969 Landi ..................... C08C 19/28
                                                        429/404
3,759,748 A * 9/1973 Palmer .................. H01M 12/08
                                                        429/403

(Continued)

FOREIGN PATENT DOCUMENTS

CN    103975481 A    8/2014
EP    0294327 A2    12/1988

(Continued)

OTHER PUBLICATIONS

Communication and partial supplementary European search report dated Mar. 27, 2015 from the corresponding European Application No. 13757388.7.

*Primary Examiner* — Kenneth Douyette
(74) *Attorney, Agent, or Firm* — Young Basile Hanlon & MacFarlane, P.C.

(57) ABSTRACT

An air battery has a cathode layer, an anode layer and an electrolyte layer interposed between the cathode and anode layers. At least one of the cathode and anode layers has a passage forming member such that, when the air battery is adjacently stacked to another air battery, the passage forming member is situated between the air battery and the adjacent air battery so as to form an air passage to cathode layer. The passage forming member has conductivity and the ability to be elastically deformed according to expansion of the electrolyte layer. It is possible by this structure to, when there occurs increase in internal resistance due to expansion of the electrolyte layer, compensate such increase in internal resistance by decrease in contact resistance, maintain the (Continued)

cross-sectional area of the air passage at a predetermined size and prevent decrease in the output of the air battery.

14 Claims, 13 Drawing Sheets

(56) References Cited

U.S. PATENT DOCUMENTS

| | | | |
|---|---|---|---|
| 3,834,944 A * | 9/1974 | Dennison | H01M 12/065 429/118 |
| 4,828,939 A | 5/1989 | Turley et al. | |
| 4,894,295 A * | 1/1990 | Cheiky | H01M 12/06 429/175 |
| 4,950,561 A * | 8/1990 | Niksa | H01M 2/08 429/404 |
| 5,328,778 A | 7/1994 | Woodruff et al. | |
| 5,424,143 A * | 6/1995 | Shrim | H01M 12/065 429/403 |
| 5,650,241 A * | 7/1997 | McGee | H01M 2/20 429/100 |
| 7,618,739 B2 | 11/2009 | Broburg et al. | |
| 8,048,587 B2 | 11/2011 | Simpkins et al. | |
| 2008/0254345 A1 | 10/2008 | Broburg et al. | |
| 2011/0195321 A1 | 8/2011 | Takahashi et al. | |
| 2012/0021303 A1 * | 1/2012 | Amendola | H01M 4/42 429/406 |
| 2012/0321968 A1 | 12/2012 | Sato et al. | |
| 2014/0315106 A1 | 10/2014 | Miyazawa et al. | |

FOREIGN PATENT DOCUMENTS

| | | |
|---|---|---|
| FR | 2162260 A1 | 7/1973 |
| JP | 07-505009 A | 6/1995 |
| JP | 3735518 B2 | 1/2006 |
| JP | 2010-524192 A | 7/2010 |
| JP | 2011-146339 A | 7/2011 |

* cited by examiner

FIG. 19A
FIG. 19B
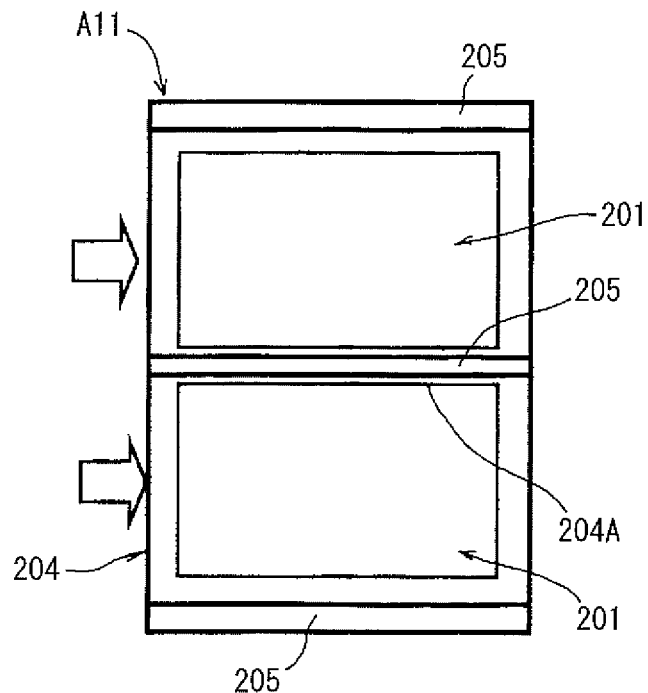
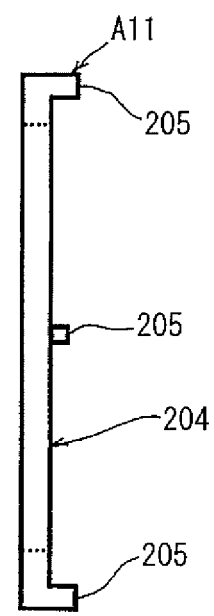
FIG. 20A
FIG. 20B
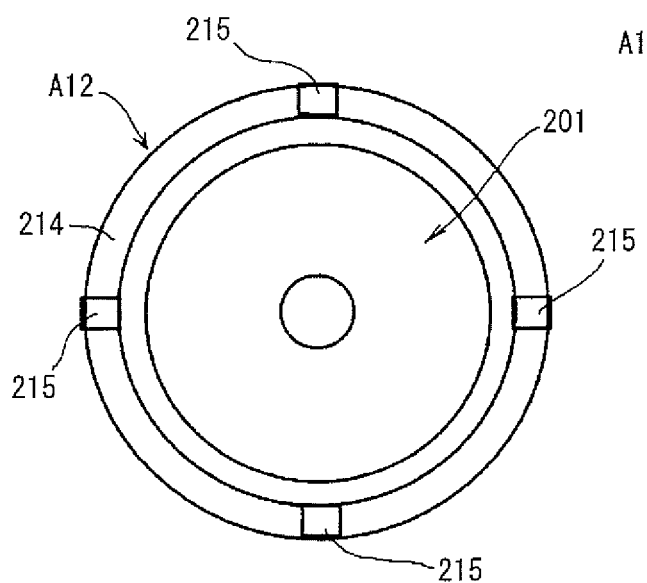
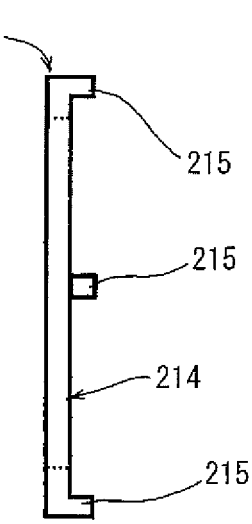

AIR BATTERY

CROSS REFERENCE TO RELATED APPLICATIONS

The present application claims priority to Japanese Patent Application Nos. 2012-052768, filed Mar. 9, 2012 and 2012-052771, filed Mar. 9, 2012, each incorporated herein in its entirety.

FIELD OF THE INVENTION

The present invention relates to an air battery using oxygen as a cathode active material, particularly of the type suitable for constituting a battery pack by connection of a plurality of air batteries.

BACKGROUND ART

There is conventionally known an air battery of the type disclosed in Japanese Patent No. 3735518. The air battery of Japanese Patent No. 3735518 has an electrode unit, in which a non-aqueous electrolyte layer is interposed between a cathode and an anode, accommodated together with terminals of the cathode and the anode in an accommodation casing such that both of the terminals protrude in opposite directions from the accommodation casing. In the air battery, a plurality of air holes are made in a cathode-side wall portion of the accommodation casing and closed with a seal tape. For use of the air battery, the seal tape is peeled off so as to open the air holes and provide a supply of air (oxygen) to the cathode.

In recent years, researches and developments have been made on air batteries as drive power sources or auxiliary power sources for vehicles e.g. automotive vehicles. It is required to, for use in a vehicle, form air batteries with a simple thin structure and constitute a battery pack by series connection of the air batteries in view of the output and capacity required for the vehicle and the narrow limited installation space in the vehicle etc. However, air batteries of the above conventional type cannot directly be connected to each other and are substantially impractical to use as vehicle power sources.

Further, the cathode layer is formed of a thin air-permeable material in the above conventional air battery. The mechanical strength of the cathode layer is thus lower than that of the metallic anode layer so that the cathode layer may be warped outwardly when electrolyte expansion occurs due to heat generation or oxide formation after the initiation of use of the air battery. It is thus likely that the conventional air battery will cause increase in internal resistance and decrease in air passage cross-sectional area and thereby decrease in output especially in the case where the air battery is reduced in thickness. It has been a challenge to solve these problems.

SUMMARY OF THE INVENTION

The present invention has been made in view of the above conventional problems. It is an object of the present invention to provide a thin air battery capable of, when there occurs increase in internal resistance due to electrolyte expansion, compensating such increase in internal resistance by decrease in contact resistance and maintaining a predetermined air passage cross-sectional area, so as to be suitable for use in a vehicle.

According to one aspect of the present invention, there is provided an air battery, comprising: a cathode layer; an anode layer; and an electrolyte layer interposed between the cathode layer and the anode layer, wherein at least one of the cathode layer and the anode layer has a passage forming member such that, when the air battery is adjacently stacked to another air battery, the passage forming member is situated between the air battery and the another air battery so as to form an air passage to cathode layer; and wherein the passage forming member has conductivity and the ability to be elastically deformed according to expansion of the electrolyte layer.

The above air battery is able to, when there occurs increase in internal resistance due to expansion of the electrolyte layer, compensate such increase in internal resistance by decrease in contact resistance and maintain the cross-sectional area of the air passage at a predetermined size. It is thus possible to prevent decrease in the output of the air battery and achieve thickness reduction of the air battery for suitable use in a vehicle.

According to another aspect of the present invention, there is provided an air battery, comprising: a cathode layer; an anode layer; an electrolyte layer interposed between the cathode layer and the anode layer; and a protrusion formed on at least one of cathode and anode sides of the air battery so as to, when the air battery is adjacently stacked to another air battery, form an air passage between the air battery and the another air battery. It is preferable to form a plurality of the protrusions in two or more places between the air batteries in view of the air passage and the stability for the stacked state. It is also preferable to form the protrusion in any place other than the surface of the cathode layer in view of the power generation efficiency.

The above air battery is able to secure the adequate cross-sectional area of the air passage for air flow to the cathode layer in the stacked state. It is thus possible to prevent decrease in the output of the air battery caused by decrease in the cross-sectional area of the air passage and achieve thickness reduction of the air battery for suitable use in a vehicle.

BRIEF DESCRIPTION OF DRAWINGS

FIGS. 19(A) and (B) are a plan view and a side view of an air battery according to still another embodiment of the present invention.

FIGS. 20(A) and (B) are a plan view and a side view of an air battery according to still another embodiment of the present invention.

DESCRIPTION OF EMBODIMENTS

Hereinafter, air batteries according to exemplary embodiments of the present invention will be described below with reference to the drawings.

Figure 1A:
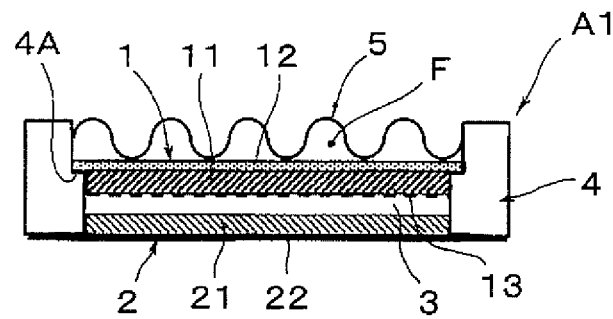
FIG. 1(A) is a cross-section view of an air battery according to one embodiment of the present invention.
Figure 1B:
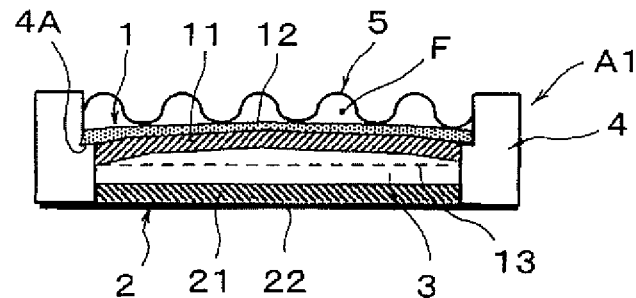
FIG. 1(B) is a cross-section view of the air battery in a state where electrolyte is expanded.
Figure 2A:
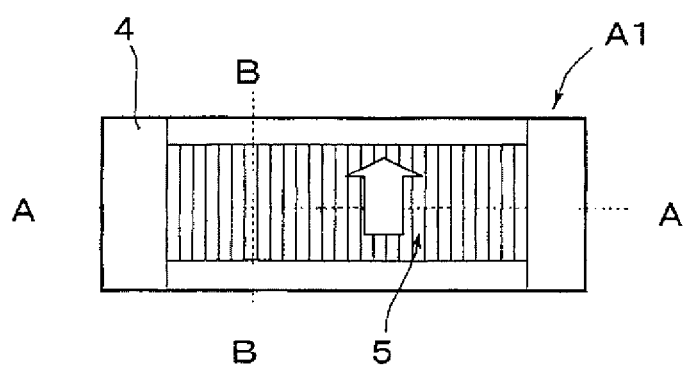
FIG. 2(A) is a plan view of the air battery of FIG. 1.
Figure 2B:
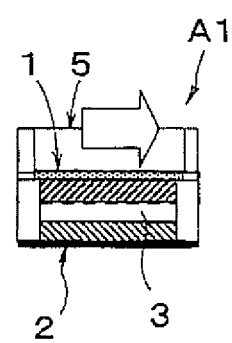
FIG. 2(B) is a cross-section view of the air battery taken along line B-B of FIG. 2(A).
Figure 3:
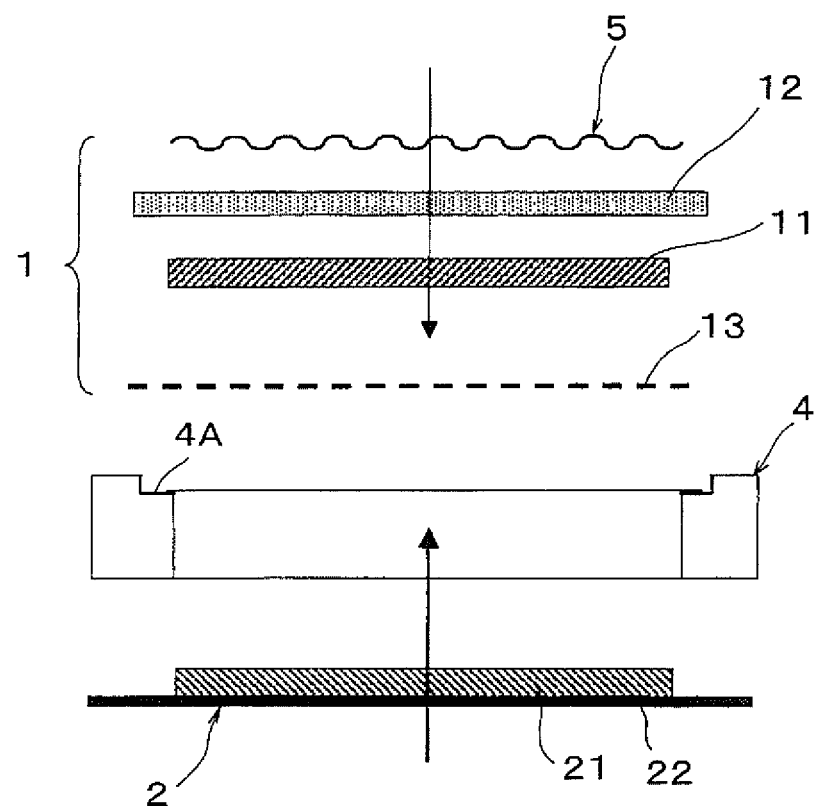
FIG. 3 is an exploded cross-section view of the air battery of FIG. 1.

The air battery A1 of FIGS. 1(A) and 2 has a rectangular plate shape and includes a cathode layer 1, an anode layer 2, an electrolyte layer 3 interposed between the cathode layer 1 and the anode layer 2 and a frame member 4 surrounding at least outer circumferences of the cathode layer 2 and the electrolyte layer 3. It is herein noted that: FIG. 1 is a cross-section view taken along line A-A of FIG. 2(A); and FIG. 2(B) is a cross-section view taken along line B-B of FIG. 2(B).

The cathode layer 1 has a catalyst layer portion 11 containing a gas diffusion layer region, a water-repellent layer portion 12 located on a cathode surface (upper battery surface in the drawing) and a cathode collector portion 13 made of a metal mesh material etc. The catalyst layer portion 11 is made of a conductive porous material. For example, the catalyst layer portion 11 is in the form of a porous body prepared from a carbon material and a binder resin and carrying therein a catalyst such as manganese dioxide.

The water-repellent layer portion 12 has fluid tightness against electrolyte and air permeability against oxygen. For example, the water-repellent layer portion 12 is in the form of a water-repellent film such as fluoro resin film capable of preventing the electrolyte from leaking to the outside. On the other hand, a plurality of fine pores are made in the catalyst layer portion 11 for oxygen supply. There can also be used a conductive material in the water-repellent layer portion 12. The use of such a conductive material enables direct electrical connection of the air battery without wiring in a battery pack C.

The anode layer 2 has an anode metal layer portion 21 and an anode collector portion 22 located on an anode surface (lower battery surface in the drawing). The anode metal layer portion 21 is made of a pure metal such as lithium (Li), aluminum (Al), iron (Fe), zinc (Zn) or magnesium (Mg) or an alloy thereof.

The anode collector portion 22 is made of a conductive material capable of preventing the electrolyte from leaking to the outside. As such a conductive material, there can be used stainless steel, copper (alloy) or a metal material having a surface coated with a plating of corrosion resistant metal. It is preferable that the material of the anode collector portion 22 has higher electrolyte resistance than that of the anode metal layer portion 21.

The electrolyte layer 3 is formed by impregnating a separator with an aqueous or non-aqueous solution (electrolytic solution) containing potassium hydroxide (KOH) or chloride as a main component. A plurality of fine pores are made in the separator at a predetermined ratio to store therein the aqueous or non-aqueous solution. Alternatively, the electrolyte layer 3 itself may be formed of a solid or gel electrolyte.

The frame member 4 has a rectangular frame shape. Preferably, the frame member 4 is made of an electrolyte-resistant resin such as polypropylene (PP) or engineering plastic material. The use of such an electrolyte-resistant resin leads to weight reduction. As the material of the frame member 4, there can alternatively be used a fiber-reinforced plastic material (FRP) in which a resin is mixed with reinforcing fibers such as carbon fibers or glass fibers to ensure mechanical strength.

Figure 4:
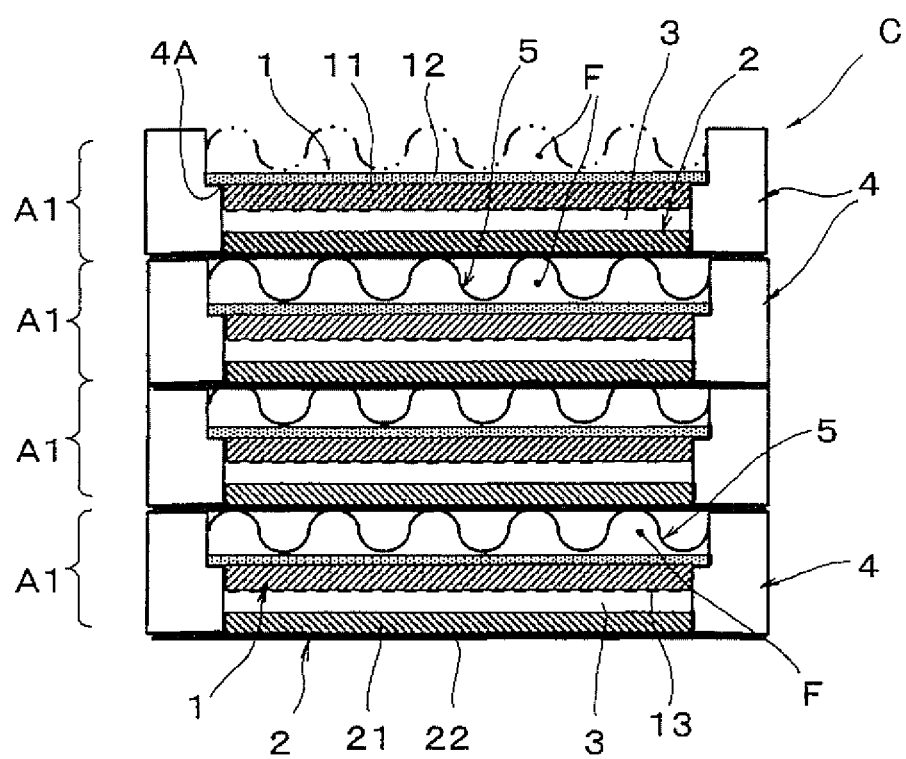
FIG. 4 is a cross-section view of a battery pack in which air batteries of the type of FIG. 1 are stacked together.

Short sides of the frame member 4 protrude more upward than long sides of the frame member 4. Further, a step portion 4A is provided around an inner circumferential part of the frame member 4 to receive thereon an outer circumferential edge of the water-repellent layer portion 12 of the cathode layer 1. As the short sides of the frame member 4 protrude upward as mentioned above, there is a space defined on the surface of the cathode layer so as to allow a flow of air in the in-plane direction (i.e. direction along the surface) as indicated by an arrow in FIG. 2 when the battery pack C is constituted by stacking of a plurality of the air batteries A1 as shown in FIG. 4.

The frame member 4 may have an electrolyte injection portion equipped with a valve etc. to inject the electrolyte to the electrolyte layer 3. In this case, the air battery A1 is configured as a liquid injection type battery.

In the air battery A1, at least one of the cathode layer 1 and the anode layer 2 has a passage forming member 5 such that, when the air battery A1 is stacked to another air battery A1, the passage forming member 5 is situated between the air battery A1 and the adjacent air battery A1 so as to form an air passage F to the cathode layer 1. In this embodiment, the passage forming member 5 is provided to the cathode layer 1.

The passage forming member 5 has conductivity and the ability to be elastically deformed according to expansion of the electrolyte layer 3. In a free state, the passage forming member 5 has a thickness dimension (height dimension) corresponding to the protrusion amount of the short sides (difference in height between the short sides and the long sides) of the frame member 4.

In this embodiment, the passage forming member 5 is wavy in cross section and is elastically deformable in a thickness direction thereof. The air passage F is formed in cathode-side (lower-side) valley portions of the wavy passage forming member 5. Further, the passage forming member 5 is made of a conductive metal or a resin having a surface covered with a coating of conductive metal.

Preferably, the passage forming member 5 is joined to either one of the cathode layer 1, the anode layer 2 and the frame member 4 and thereby integrated as the structural part of the air battery A1. In this embodiment, the passage forming member 5 is joined to at least one of the cathode layer 1 and the frame member 4 because the passage forming member 5 is provided to the cathode layer 1. It suffices to join at least a part of an outer circumference of the passage forming member 5. More preferably, the passage forming member 5 is joined to the frame member 4 in view of the material jointability etc.

The above-structured air batteries A1 are stacked together to constitute the battery pack C as shown in FIG. 4. At this time, the passage forming member 5 is sandwiched between the adjacent air batteries A1 so as to form the air passage F while functioning as a connector for electrical connection between these adjacent air batteries A1.

After the initiation of use of the air battery A1, the cathode layer 1 may be warped outwardly as shown in FIG. 1(B) when the electrolyte of the electrolyte layer 3 becomes expanded due to heat generation or oxide formation. The internal resistance of the air battery A1 is increased by oxide formation. In the case where no passage forming part 5 is provided, the cross-sectional area of the air passage is decreased by warpage of the cathode layer 1. These factors cause decrease in the output of the air battery A1.

In the air battery A1, however, the passage forming member 5 can maintain the cathode layer 1 flat so as to level out the displacement of the electrolyte layer 3 and increase the surface pressure between these structural parts even when the electrolyte of the electrolyte layer 3 becomes expanded. In other words, the air battery A1 can increase the contact force between the structural parts by tactfully utilizing the expansion of the electrolyte layer 3. The air battery A1 is thus able to compensate increase in internal resistance by decrease in contact resistance and maintain the cross-sectional area of the air passage F at a predetermined size. It is accordingly possible for the air battery A1 to prevent decrease in output and achieve stable power generation (discharge).

Further, the air battery A1 can be reduced in thickness because of its very simple structure and, at the same time, can be directly connected in series with no wiring. For these reasons, the air battery A1 is very suitable for use in a vehicle.

As the passage forming member 5 is made of a conductive metal or a resin having a surface covered with a coating of conductive metal, the air battery A1 can attain a very low contact resistance for improvement in output performance. In particular, the air battery A1 can achieve further weight reduction when the passage forming member 5 is made of metal-coated resin.

Furthermore, the frame member 4 is provided in the air battery A1 so as to surround at least the outer circumferences of the electrolyte layer 3 and the cathode layer 1; and the passage forming member 5 is joined to either one of the cathode layer 1, the anode layer 2 and the frame member 4. The air battery A1 can thus achieve reduction in contact resistance and improvement in ease of handling.

When the battery pack C is constituted by the air batteries A1 as shown in FIG. 4, it is feasible to omit the passage forming member 5 from the uppermost air battery A1 as indicated by an imaginary line in the drawing. In the case where end plates are provided on both ends of the battery pack C in the stack direction, the passage forming member 5 may be situated between the air battery and the end plate.

FIGS. 5 and 6 show other examples of the passage forming member usable in the present invention. These passage forming members 15 and 25 are each adapted to increase the area of contact with the cathode and anode layers 1 and 2 by compressive deformation in a thickness direction thereof.

Figure 5A:
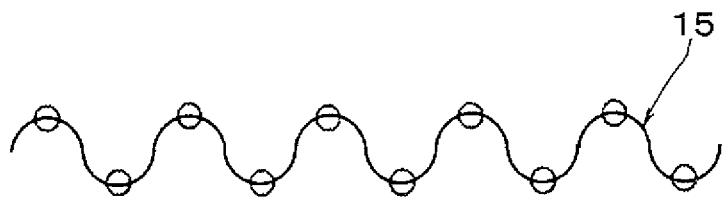
FIG. 5(A) is a side view showing another example of passage forming member.
Figure 5B:
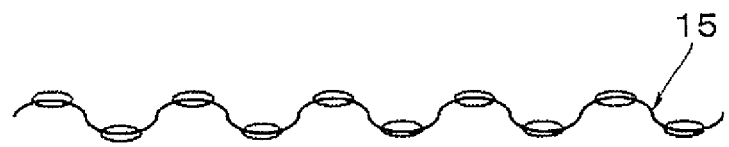
FIG. 5(B) is a side view showing a state where the passage forming member of FIG. 5(A) is compressed and deformed.

As shown in FIG. 5, the passage forming member 15 has a wavy cross section. In a normal state of FIG. 5(A), upper and lower peak portions of the passage forming member 15 are in contact with the cathode and anode layers 1 and 2. Herein, the passage forming member 15 makes line contact between the peak portions and the electrode layers because of its wavy cross-section shape. When the passage forming member 15 is compressed and deformed in the thickness direction, the peak portions of the passage forming member 5 are crushed so as to increase the area of contact of the passage forming member 5 with the cathode and anode layers 1 and 2 as shown in FIG. 5(B). It is herein noted that the circles in FIG. 5(A) and the ovals in FIG. 5(B) show increase in the contact area of the passage forming member 5.

Figure 6A:
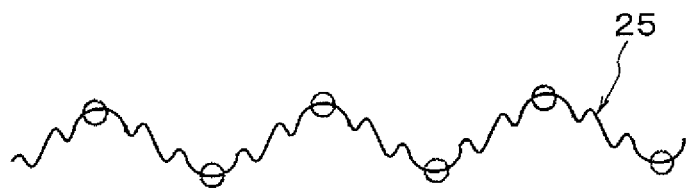
FIG. 6(A) is a side view showing still another example of passage forming member.
Figure 6B:
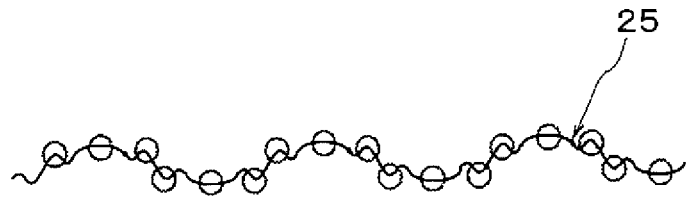
FIG. 6(B) is a side view showing a state where the passage forming member of FIG. 6(A) is compressed and deformed.

As shown in FIG. 6, the passage forming member 25 has a wavy cross section formed by combination of large and small waveforms. In a normal state of FIG. 6(A), large-waveform peak portions of the passage forming member 25 are in contact with the cathode and anode layers 1 and 2. When the passage forming member 25 is compressed and deformed in the thickness direction, the large-waveform peak portions of the passage forming member 25 are crushed such that small-waveform peak portions of the passage forming member 25 are brought into contact with the cathode and anode layers 1 and 2 as shown in FIG. 6(B). Namely, the contact points of the passage forming member 25 is increased by compression deformation of the passage forming member 25 so as to increase the area of contact of the passage forming member 5 with the cathode and anode layers 1 and 2 as indicated by the circles in FIG. 6.

With the use of the passage forming member 15, 25, it is possible for the air battery A1 to obtain the same effects as those of the above embodiment. Further, the area of contact of the passage forming member 15, 25 with the cathode and anode layers 1 and 2 is increased when the passage forming member 15, 25 is compressed and deformed in the thickness direction according to expansion of the electrolyte of the electrolyte layer 3. It is thus possible for the air battery A1 to decrease the contact resistance between the passage forming member 15, 25 and the cathode and anode layers 1 and 2, prevent decrease in output and achieve stable power generation (discharge).

FIG. 7 shows other examples of the passage forming member usable in the present invention.

Figure 7A:
FIGS. 7(A) to (F) are side views showing other examples of passage forming member.
Figure 7B:
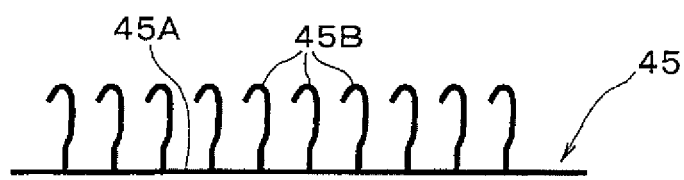

The passage forming member 35 of FIG. 7(A) is in the form of a non-woven fabric sheet of linear material and is deformable in a thickness direction thereof. The passage forming member 45 of FIG. 7(B) is in the form of a sheet 45A with a plurality of elastic hooks 45B as corresponding in structure to a hook side of a hook-and-loop fastener and is deformable in a thickness direction thereof. In this example, the elastic hooks 45B of the passage forming member 45 are brought into contact with the cathode layer 1. There can alternatively be used a passage forming member corresponding in structure to a loop side of a hook-and-loop fastener.

Figure 7C:
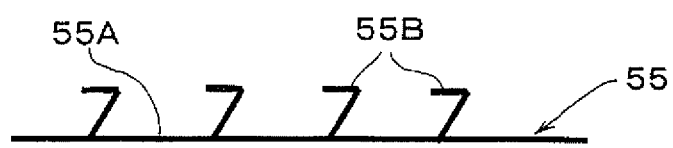

The passage forming member 55 of FIG. 7(C) is in the form of a sheet 55A with a plurality of elastic cantilever-shaped protrusions 55B and is deformable in a thickness direction. In this example, the elastic protrusions 55B of the passage forming member 55 are brought into contact with the cathode layer 1. Alternatively, the elastic protrusions 55B may be formed into a tongue shape and arranged in vertical and horizontal directions or may be formed into an elongated shape so as to be continuous in cross section in the drawing and arranged in parallel with each other.

Figure 7D:
Figure 7E:
Figure 7F:

The passage forming member 65 of FIG. 7(D) is provided by arranging a plurality of coils in parallel with each other and is deformable in a thickness direction thereof. The passage forming member 75 of FIG. 7(E) is formed into a wavy cross-section shape, with a plurality of pores made therethrough, and is deformable in a thickness direction thereof. The passage forming member 85 of FIG. 7(F) is provided by forming a mesh material into a wavy cross-section shape and is deformable in a thickness direction thereof.

Each of the above passage forming members 35, 45, 55, 65, 75 and 85 is made of a conductive metal or a resin having a surface covered with a coating of conductive metal. The passage forming member may be provided in any form other than the above illustration examples as long as the passage forming member is deformable in the thickness direction. It is possible in the air battery A1 and the battery pack C to, even when there occurs increase in internal resistance due to electrolyte expansion, compensate such increase in internal resistance by decrease in contact resistance, maintain the cross-sectional area of the air passage at a predetermined size and thereby prevent decrease in output even with the use of any of these passage forming members.

The passage forming members 35, 65, 75 and 85 of FIGS. 7(A), (D), (E) and (F) have air permeability and thus can not only attain a larger cross-sectional area of air passage F for improvement in output performance but also achieve further weight reduction. It is feasible to impart air permeability to the passage forming members 45 and 55 of FIGS. 7(A) and (B) by making a plurality of pores in the sheets 45A and 55A.

Figure 8:
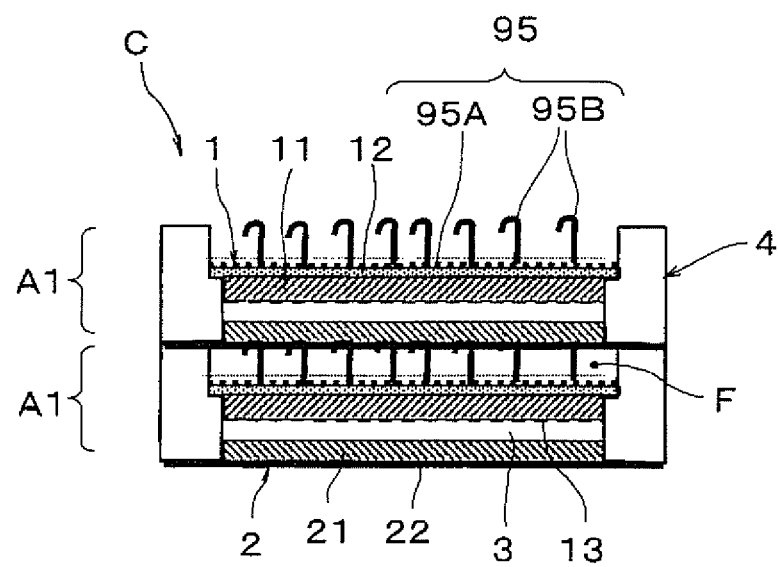
FIG. 8 is a cross-section view of an air battery according to another embodiment of the present invention.
Figure 9:
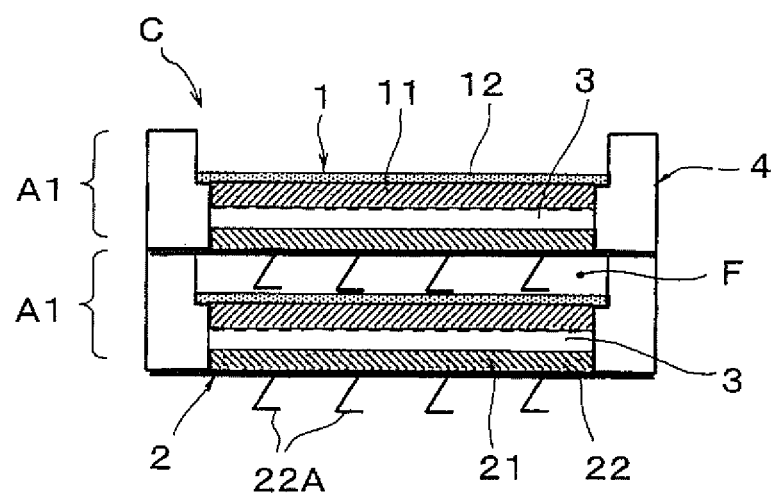
FIG. 9 is a cross-section view of an air battery according to still another embodiment of the present invention.

FIGS. 8 and 9 show the air battery A1 and the battery pack C, in which the passage forming member is formed integral with either one of the cathode layer 1 and the anode layer 2.

In the air battery A1 of FIG. 8, the passage forming member 95 is formed integral with the cathode layer 1. The passage forming member 95 is in the form of a mesh sheet 95A with a plurality of elastic hooks 95B and is conductive and elastically deformable in a thickness direction thereof. In the battery pack C, the passage forming member 95 of the air battery A1 forms an air passage F by contact with the anode layer 2 of the upper-side air battery A1.

In the air battery A1 of FIG. 9, the passage forming member 22A is formed integral with the anode layer 2. The passage forming member 22A is provided as elastic cantilever-shaped protrusions as in the case of the passage forming member 55 of FIG. 7(C) and is made integral with the anode collector portion 22 of the anode layer 2.

This passage forming member 22A is also conductive and elastically deformable in a thickness direction thereof. In the battery pack C, the passage forming member 22A forms an air passage F by contact with the cathode layer 1 of the lower-side air battery A1.

Even in these cases, it is possible for the air battery A1 to obtain the same effects as those of the above embodiment. It is further possible to achieve reduction in parts count and further reduction in contact resistance for cost reduction and performance improvement of the air battery A1 and the battery pack C as the passage forming member 95, 22A is formed integral with either one of the cathode layer 1 and the anode layer 2.

Figure 10A:
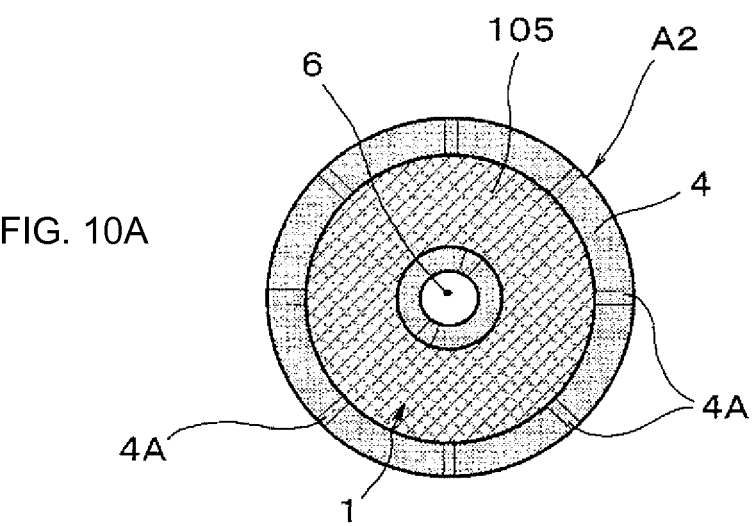
FIG. 10(A) is a plan view of an air battery according to still another embodiment of the present invention.
Figure 10B:
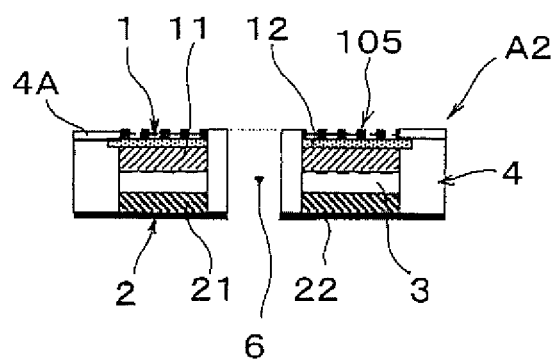
FIG. 10(B) is a cross-section view of the air battery of FIG. 10(A).

The air battery A2 of FIG. 10 has a circular disk shape and has the same basic structure as that of the above air battery. More specifically, the air battery A2 includes a cathode layer 1, an anode layer 2, an electrolyte layer 3 interposed between the cathode layer 1 and the anode layer 2 and a frame member 4 surrounding at least outer circumferences of the cathode layer 2 and the electrolyte layer 3. An air flow hole 6 is made in the center of the air battery A2. Air flow groves 4A are made in an upper surface of the frame member 4 and circumferentially spaced at predetermined intervals.

In the air battery A2, the cathode layer 1 has a passage forming member 105 such that, when the air battery A2 is stacked to another air battery A2, the passage forming member 105 is situated between the air battery A2 and the adjacent air battery A2 so as to form an air passage F to the cathode layer 1. In this embodiment, the passage forming member 105 is made of a metal mesh material and thus has conductivity and the ability to be elastically deformed according to expansion of the electrolyte layer 3. It is possible for the air battery A2 to obtain the same effects as those of the above embodiment.

Figure 11A:
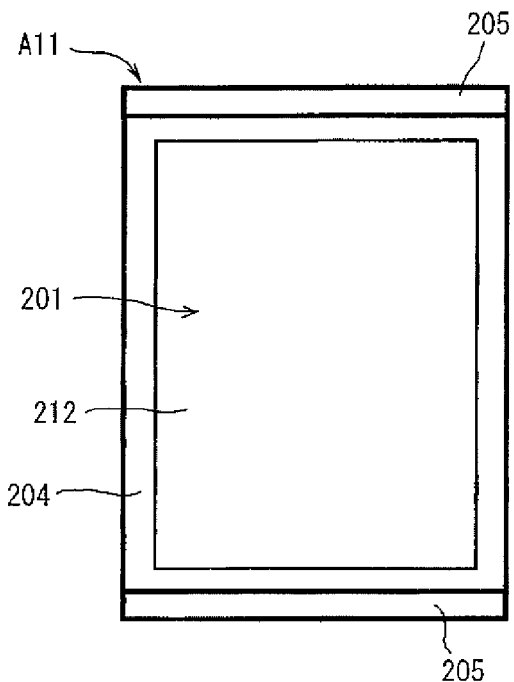
FIGS. 11(A) and (B) are a plan view and a side view of an air battery according to still another embodiment of the present invention.
Figure 11B:
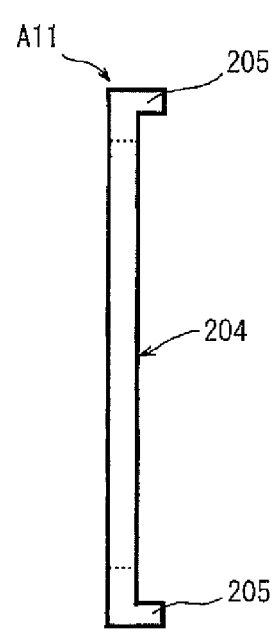
Figure 12:
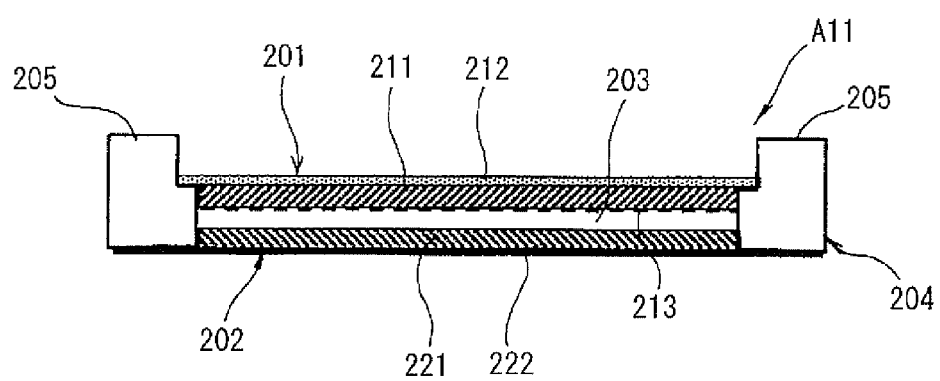
FIG. 12 is a cross-section view of the air battery of FIG. 11.

FIGS. 11 and 12 show the air battery according to the still another embodiment of the present invention.

The air battery A11 of FIGS. 11 and 12 has a rectangular plate shape and includes a cathode layer 201, an anode layer 202 and an electrolyte layer 203 interposed between the cathode layer 201 and the anode layer 202. The air battery A11 also includes, as its basic structural part, a protrusion 205 formed on at least one of cathode layer 201 side and anode layer 202 side of the air battery A11 so as to, when the air battery A11 is stacked to another air battery A11, form an air passage F between the air battery A11 and the adjacent air battery A11.

In this embodiment, the protrusion 205 is formed on the cathode layer 201 side of the air battery A11 as shown in the drawings. Further, the air battery A11 includes a frame member 204 having electrical insulation properties and surrounding outer circumferences of the cathode layer 201 and the anode layer 202. The protrusion 205 is formed on this frame member 204.

Figure 13:
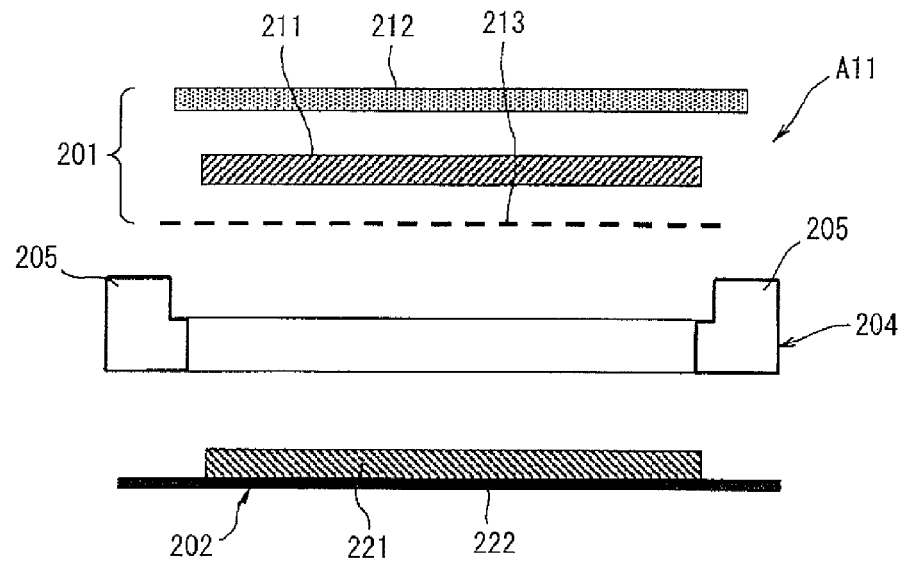
FIG. 13 is an exploded cross-section view of the air battery of FIG. 11.

As shown in FIG. 13, the cathode layer 201 has a catalyst layer portion 211 including a gas diffusion layer region, a water-repellent layer portion 212 located on a cathode surface (upper battery surface in the drawing) and a cathode collector portion 213 made of a metal mesh material etc. The catalyst layer portion 211 is made of a conductive porous material. For example, the catalyst layer portion 11 is in the form of a porous body prepared from a carbon material and a binder resin and carrying therein a catalyst such as manganese dioxide.

The water-repellent layer portion 212 has fluid tightness against electrolyte and air permeability against oxygen. For example, the water-repellent layer portion 212 is in the form of a water-repellent film such as fluoro resin film capable of preventing the electrolyte from leaking to the outside. On the other hand, a plurality of fine pores are made in the catalyst layer portion 211 for oxygen supply. There can also be used a conductive material in the water-repellent layer portion 212. The use of such a conductive material enables direct electrical connection of the air battery without wiring in a battery pack C.

The anode layer 202 has an anode metal layer portion 221 and an anode collector portion 222 located on an anode surface (lower battery surface in the drawing) as also shown in FIG. 13. The anode metal layer portion 221 is made of a pure metal such as lithium (Li), aluminum (Al), iron (Fe), zinc (Zn) or magnesium (Mg) or an alloy thereof.

The anode collector portion 222 is made of a conductive material capable of preventing the electrolyte from leaking to the outside. As such a conductive material, there can be used stainless steel, copper (alloy) or a metal material having a surface coated with a plating of corrosion resistant metal. It is preferable that the material of the anode collector portion 222 has higher electrolyte resistance than that of the anode metal layer portion 221.

The electrolyte layer 203 is formed by impregnating a separator with an aqueous or non-aqueous solution (electrolytic solution) containing potassium hydroxide (KOH) or chloride as a main component. A plurality of fine pores are made in the separator at a predetermined ratio to store therein the aqueous or non-aqueous solution. Alternatively, the electrolyte layer 203 itself may be of a solid or gel electrolyte.

The frame member 204 has a rectangular frame shape. Preferably, the frame member 4 is made of an electrolyte-resistant resin such as polypropylene (PP) or engineering plastic material. The use of such an electrolyte-resistant resin leads to weight reduction. As the material of the frame member 204, there can alternatively be used a fiber-reinforced plastic material (FRP) in which a resin is mixed with reinforcing fibers such as carbon fibers or glass fibers to ensure mechanical strength.

Figure 14:
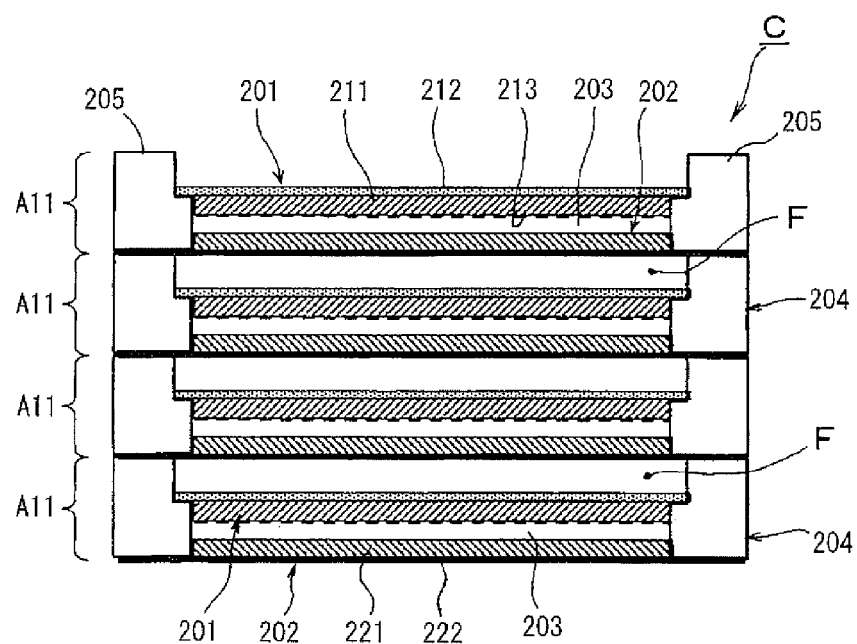
FIG. 14 is a cross-section view of a battery pack in which air batteries of the type of FIG. 11 are stacked together.

In the case where the frame member 204 is made of a resin material as mentioned above, it is feasible to form the protrusion 205 integral with the frame member 204 by injection molding. In the case where the frame member 204 has a rectangular frame shape as mentioned above, the protrusion 205 is preferably formed on each of at least two opposite sides of the frame member 204. In this embodiment, the protrusion 205 is formed on each of opposite short sides of the frame member 204 in a length direction thereof. By this, there is a space defined as the air passage F on the surface of the cathode layer 201 so as to allow a flow of air in the in-plane direction (i.e. direction along the surface) as indicated by an arrow in FIG. 11 when the battery pack C is constituted by stacking of a plurality of the air batteries A11 as shown in FIG. 14. The protrusion 205 is thus formed in the direction of air flow to the cathode layer.

The frame member 204 may have an electrolyte injection portion equipped with a valve etc. to inject the electrolyte to the electrolyte layer 203. In this case, the air battery A11 is configured as a liquid injection battery.

The above-structured air batteries A11 are stacked together to constitute the battery pack C as shown in FIG. 14. At this time, the air passage F to the cathode layer 201 is formed by the protrusion 205 between the air battery A11 and the upper-side adjacent air battery A11.

After the initiation of use of the air battery A11 in the battery pack C, the cathode layer 201 may be warped outwardly as shown in FIG. 1(B) when the electrolyte of the electrolyte layer 203 becomes expanded due to heat generation or oxide formation. However, the protrusion 205 can maintain the adequate cross-sectional area of the air passage F. It is accordingly possible for the air battery A11 to prevent decrease in output and achieve thickness reduction for suitable use in a vehicle. Further, the air battery A11 can be reduced in thickness because of its very simple structure and, at the same time, can be directly connected in series with no wiring. For these reasons, the air battery A11 is very suitable for use in a vehicle.

Furthermore, the frame member 204 is provided in the air battery A11; and the protrusion 205 is formed on the frame member 204. The air battery A11 can thus secure the air passage F without causing decreases in reaction area surfaces of the cathode layer 201 and the anode layer 202.

As the protrusion 205 is formed integral with the frame member 204, the air battery A11 can achieve reduction in parts count, eliminate the need for joints that become a cause of deterioration in sealing performance, and thereby attain high productivity.

There is no fear of increase in the pressure loss of the air flow as the protrusion 205 is formed in the direction of air flow to the cathode layer 201. The air battery A11 can thus maintain the pressure loss of the air flow at a low level and limit the height of the air passage F to a small level for further thickness reduction.

In addition, the protrusion 205 is formed on each of the opposite short sides of the rectangular frame member 204 so that the air battery A11 can define the directional air passage F and ensure the stability for the stacked state.

Although the protrusion 205 is provided on the cathode layer 201 side of the frame member 204 in the above embodiment, it is alternatively feasible to provide the protrusion in any other place. For example, the protrusion can be provided on the anode layer 202 side or on both of the cathode and anode layer sides. In view of the power generation efficiency, it is preferable to form the protrusion in any place other than the surface of the cathode layer 201. It is further preferable to form a plurality of the protrusions in two or more places between the air batteries A11 in order to ensure the air passage F and the stability for the stacked state.

Figure 15A:
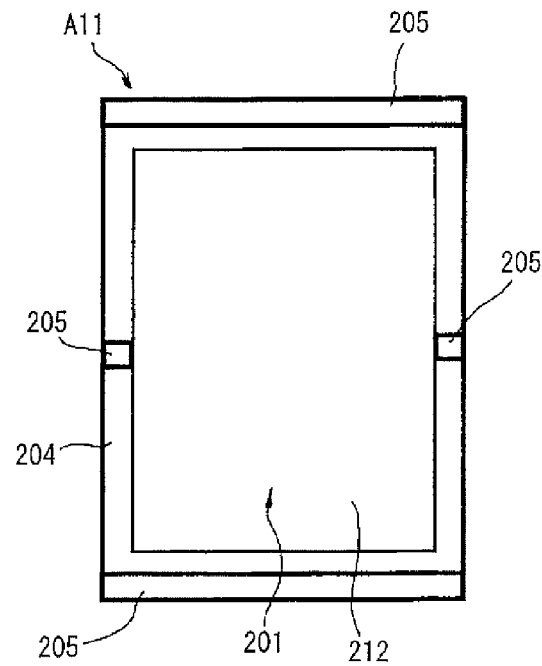
FIGS. 15(A) and (B) are a plan view and a side view of an air battery according to still another embodiment of the present invention.
Figure 15B:
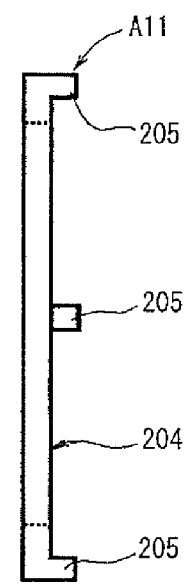

The air battery A11 of FIG. 15 has, at its cathode layer 201 side, protrusions 205 formed along two respective short sides of the frame member 204 and formed on center portions of two long sides of the frame member 204. Even in this case, it is possible for the air battery A11 to obtain the same effects as those of the above embodiment. Especially in the case where the air battery A11 is increased in area, it is advantageously possible to prevent the occurrence of warpage, obtain improvement in the stability for the stacked state and maintain the adequate cross-sectional area of the air passage F.

Figure 16:
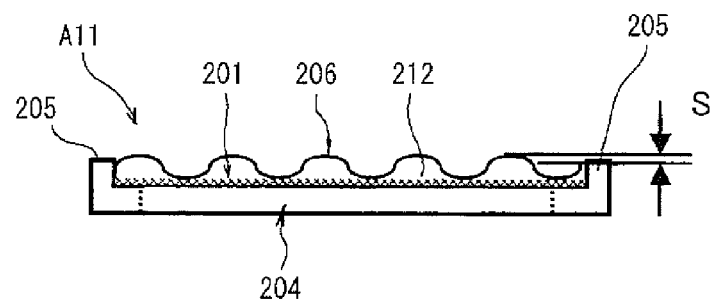
FIG. 16 is a side view of an air battery according to still another embodiment of the present invention.

The air battery A11 of FIG. 16 has a passage forming member 206 provided to at least one of the cathode layer 201 and the anode layer 202 such that, when the air battery A11 is stacked to another air battery A11, the passage forming member 206 is situated between the air battery A11 and the adjacent air battery A11. The passage forming member 206 has the ability to be elastically deformed in a thickness direction thereof. In this embodiment, the passage forming member 206 is provided to the cathode layer 201. The passage forming member 206 is made of a metal material or a resin material. Further, the passage forming member 206 is wavy in cross section and is elastically deformable according to expansion of the electrolyte layer 203.

In this air battery A11, a protrusion height of the protrusion 205 is made smaller than a thickness of the passage forming member 206. In a free state, the passage forming member 206 is higher by a difference S than the protrusion 205 as shown in FIG. 16. The air passage F is herein formed in lower-side valley portions of the wavy passage forming member 206.

Figure 17:
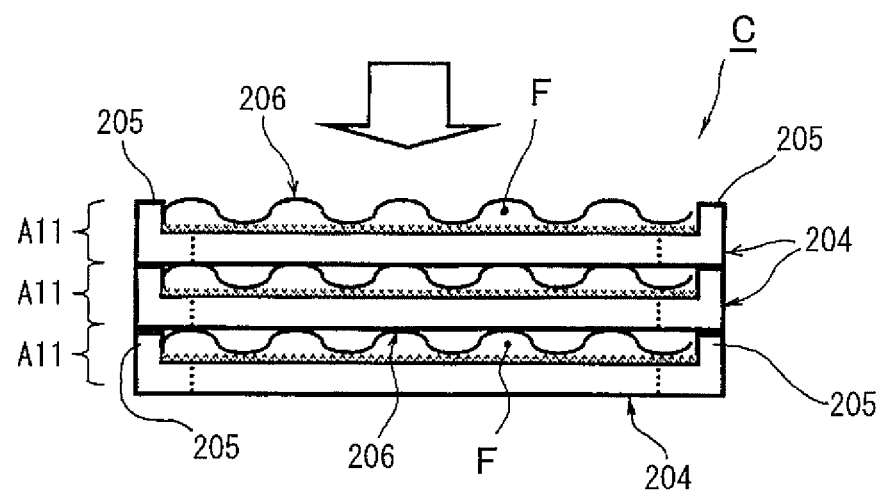
FIG. 17 is a cross-section view of a battery pack in which air batteries of the type of FIG. 16 are stacked together.

The battery pack C is constituted by stacking of a plurality of the air batteries A11 as shown in FIG. 17. At this time, the protrusion 205 can maintain the adequate cross-sectional area of the air passage F as in the case of the above embodiment. Further, the passage forming member 206 is compressed and deformed in the thickness direction in the stacked state of the air batteries A11. Even when the electrolyte of the electrolyte layer 203 becomes expanded due to heat generation or oxide formation, the passage forming member 206 can maintain the cathode layer 201 flat so as to level out the displacement of the electrolyte layer 203 and maintain the air passage F.

FIG. 18 shows other examples of the passage forming member usable in the present invention.

Figure 18A:
FIGS. 18(A) to (E) are side views showing other examples of passage forming member.
Figure 18B:
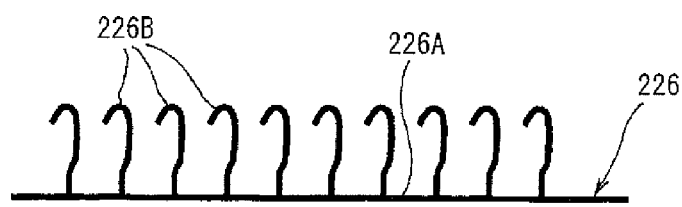

The passage forming member 216 of FIG. 18(A) is in the form of a non-woven fabric sheet of linear material and is deformable in a thickness direction thereof. The passage forming member 226 of FIG. 18(B) is in the form of a sheet 226A with a plurality of elastic hooks 226B as corresponding in structure to a hook side of a hook-and-loop fastener and is deformable in a thickness direction thereof. In this example, the elastic hooks 226B of the passage forming member 226 are brought into contact with the cathode layer 201. There can alternatively be used a passage forming member corresponding in structure to a loop side of a hook-and-loop fastener.

Figure 18C:
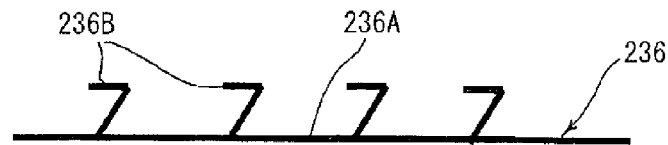

The passage forming member 236 of FIG. 18(C) is in the form of a sheet 236A with a plurality of elastic cantilever-shaped protrusions 236B and is deformable in a thickness direction. In this example, the elastic protrusions 236B of the passage forming member 236 are brought into contact with the cathode layer 201. Alternatively, the elastic protrusions 236B may be formed into a tongue shape and arranged in vertical and horizontal directions or may be formed into an elongated shape so as to be continuous in cross section in the drawing and arranged in parallel with each other.

Figure 18D:
Figure 18E:

The passage forming member 246 of FIG. 18(D) is formed into a wavy cross-section shape, with a plurality of pores made therethrough, and is deformable in a thickness direction thereof. The passage forming member 256 of FIG. 18(E) is provided by forming a mesh material into a wavy cross-section shape and is deformable in a thickness direction thereof.

The passage forming member can be provided in various forms as shown in FIGS. 18(A) to (E). In either case, it is possible for the air battery A11 to secure the cross-sectional area of the air passage F at a predetermined size and prevent decrease in output. It is feasible that the passage forming member is made of either a conductive metal, a resin having a surface covered with a coating of conductive metal, a resin material in which a metal material is dispersed or a metal material in which a carbon material is dispersed. In this case, the passage forming member also functions as a connector for electrical connection between the air batteries A11 so as to, in the occurrence of expansion of the electrolyte layer 203, maintain the cathode layer 201 flat and level out the displacement of the electrolyte layer 203 and increase the surface pressure between these structural parts while securing the air passage F. When there occurs increase in internal resistance due to oxide formation etc., the passage forming member can thus compensate such increase in internal resistance by decrease in contact resistance and thereby contribute to stable power generation (discharge) of the air battery A11.

The passage forming members 216 and 246 of FIGS. 18(A) and (D) have air permeability and thus can not only attain a larger cross-sectional area of air passage F for improvement in output performance but also achieve further weight reduction. It is feasible to impart air permeability to the passage forming members 226 and 236 of FIGS. 18(B) and (C) by making a plurality of pores in the sheets 226A and 236A.

The air battery A11 of FIG. 19 has two reaction areas, each of which is constituted by the cathode layer 201 and the anode layer 202, arranged in parallel with each other. In this case, the frame member 204 includes a center pier portion 204A extending in parallel with the short sides such that the reaction areas are divided by the center pier portion 204A. A plurality of protrusions 205 are formed on the short sides and the center pier portion 204A of the frame member 204 so as to, when the air battery A11 is stacked to another air battery A11, form an air passage F between the air battery A11 and the adjacent air battery A11.

The air battery A12 of FIG. 20 has a circular disk shape. In this case, the air battery A12 includes a ring-shaped frame member 214 having four protrusions 215 formed on the cathode layer 201 side at intervals of 90°.

The battery pack C is constituted by stacking of a plurality of the air batteries A11 or A12 of FIG. 19 or 20. The air battery A11, A12 is simple in structure and can secure the adequate cross-sectional area of the air passage F by means of the protrusion 205, 215 as in the case of the above embodiment. It is accordingly possible for the air battery A11, A12 to prevent decrease in output caused by decrease in air passage cross-sectional area and achieve thickness reduction for suitable use in a vehicle.

The battery pack according to the present invention is not limited to the above-mentioned embodiments. Various modifications and changes can be made to the above embodiments within the range that does not depart from the scope of the present invention.

The invention claimed is:

1. An air battery, comprising:
   a cathode layer;
   an anode layer;
   an electrolyte layer interposed between the cathode layer and the anode layer; and
   a frame member having electrical insulating properties and surrounding at least outer circumferences of the electrolyte layer and the cathode layer, wherein the cathode layer, the anode layer, the electrolyte layer, and the frame member form a single air battery, and wherein:
   the frame member has a step portion formed to receive thereon an outer circumferential edge of the cathode layer;
   the cathode layer has a passage forming member arranged such that, when the air battery is adjacently stacked to another air battery having another anode layer, the passage forming member is situated between and brought into contact with the cathode layer of the air battery and the other anode layer of the other air battery so as to form an air passage to the cathode layer of the air battery; and
   the passage forming member is joined to the frame member and has conductivity and the ability to be elastically deformed according to expansion of the electrolyte layer, the passage forming member having a first area of contact with the cathode layer and a second area of contact with the other anode layer, wherein the first area of contact and the second area of contact increase in size in response to compression deformation in a thickness direction of the passage forming member.

2. The air battery according to claim 1, wherein the passage forming member is made of either a conductive metal, a resin having a surface covered with a coating of conductive metal, a resin material in which a metal material is dispersed or a resin material in which a carbon material is dispersed.

3. The air battery according to claim 1, wherein the passage forming member has air permeability.

4. The air battery according to claim 1, wherein the passage forming member is formed integral with the cathode layer.

5. The air battery according to claim 1, wherein the passage forming member is wavy in cross section.

6. The air battery according to claim 1, wherein the passage forming member is elastically deformable and wavy in cross section.

7. An air battery, comprising:
a cathode layer;
an anode layer;
an electrolyte layer interposed between the cathode layer and the anode layer; and
a frame member having electrical insulating properties and surrounding at least outer circumferences of the electrolyte layer and the cathode layer, wherein the cathode layer, the anode layer, the electrolyte layer, and the frame member form a single air battery, and wherein the frame member comprises:
   a frame body formed with a step portion to receive thereon an outer circumferential edge of the cathode layer; and
   a protrusion formed integral on the frame body as a part of the frame member so as to protrude in a stacking direction of air batteries and, when the air battery is stacked to another air battery, allow contact between an inner wall of the protrusion and the cathode layer of the air battery and contact a top end of the protrusion with an anode layer of the other air battery adjacent to the air battery to thereby form an air passage surrounded by the protrusion, the air battery and the other air battery adjacent to the air battery.

8. The air battery according to claim 7, wherein the protrusion is formed in a direction of air flow to the cathode layer.

9. The air battery according to claim 8, wherein the frame member has a rectangular frame shape; and wherein the protrusion is formed on each of at least two opposite sides of the frame member.

10. The air battery according to claim 7, wherein at least one of the cathode layer and the anode layer has a passage forming member such that, when the air battery is adjacently stacked to the other air battery, the passage forming member is situated between the air battery and the other air battery; wherein the passage forming member has the ability to be elastically deformed in a thickness direction thereof; and wherein the protrusion is formed with a protrusion height smaller than a thickness of the passage forming member.

11. A battery pack comprising a plurality of air batteries stacked together, wherein each of the air batteries is the air battery according to claim 1.

12. A battery pack comprising a plurality of air batteries stacked together, wherein each of the air batteries is the air battery according to claim 7.

13. The air battery according to claim 1, wherein the step portion receives thereon the outer circumferential edge of a water-repellent layer portion of the cathode layer.

14. The air battery according to claim 7, wherein the step portion receives thereon the outer circumferential edge of a water-repellent layer portion of the cathode layer.

* * * * *